United States Patent [19]

Buchmüller et al.

[11] Patent Number: 4,676,363
[45] Date of Patent: Jun. 30, 1987

[54] ARRANGEMENT FOR FEEDING BULK MATERIAL TENDING TO CAKE

[75] Inventors: Horst Buchmüller, Hünxe; Helmut Benninghoff, Voerde, both of Fed. Rep. of Germany

[73] Assignee: Deutsche Babcock Werke Aktiengesellschaft, Oberhausen, Fed. Rep. of Germany

[21] Appl. No.: 761,346

[22] Filed: Jul. 31, 1985

Related U.S. Application Data

[63] Continuation of Ser. No. 492,429, May 6, 1983, abandoned.

[30] Foreign Application Priority Data

May 8, 1982 [DE] Fed. Rep. of Germany ....... 3217314

[51] Int. Cl.$^4$ .............................................. B65G 47/22
[52] U.S. Cl. ............................... 198/493; 198/533; 198/550.1; 198/669; 198/676
[58] Field of Search ............... 198/493, 533, 551, 568, 198/669, 676, 550.1, 662; 406/89, 193

[56] References Cited

U.S. PATENT DOCUMENTS

| | | | |
|---|---|---|---|
| 376,552 | 1/1888 | Rossler | 198/676 X |
| 587,640 | 8/1897 | von Boyneburgk | 198/669 X |
| 3,175,812 | 3/1965 | Russell | 198/533 X |
| 3,450,311 | 6/1969 | Bonneric | 198/568 X |
| 3,471,203 | 10/1969 | Farnworth | 406/89 X |
| 3,580,389 | 5/1971 | Nonnenmacher | 198/676 X |
| 3,637,069 | 1/1972 | Christian et al. | 198/676 |
| 4,363,571 | 12/1982 | Jackson et al. | 198/669 X |

FOREIGN PATENT DOCUMENTS

| | | | |
|---|---|---|---|
| 578373 | 6/1933 | Fed. Rep. of Germany | 406/193 |
| 1308542 | 12/1962 | France | 198/669 |
| 347477 | 8/1960 | Switzerland | 406/89 |
| 680460 | 10/1952 | United Kingdom | 406/89 |
| 541748 | 3/1977 | U.S.S.R. | 406/89 |

Primary Examiner—L. J. Paperner
Assistant Examiner—Jonathan D. Holmes
Attorney, Agent, or Firm—Max Fogiel

[57] ABSTRACT

In order to avoid caking of bulk material when feeding from a feeder into an inlet opening of lesser cross-section, there is provided a trough with a central discharge opening located below the discharge of the feeder. Two double paddle conveyors extend in the trough towards the central discharge opening. A vertical gravity tube joins on the trough. The tube is surrounded by one or several annular channels guiding a gaseous medium. This medium forms a gaseous screen between the bulk material flow and the gravity tube.

2 Claims, 3 Drawing Figures

ARRANGEMENT FOR FEEDING BULK MATERIAL TENDING TO CAKE

This is a continuation of application Ser. No. 492,429 filed May 6, 1983, now abandoned.

BACKGROUND OF THE INVENTION

The present invention relates to an arrangement for feeding bulk material tending to cake from a feeder via a chute into an inlet opening having a cross-section which is less than that of the discharge of the feeder.

In such arrangements the chute decreases the cross-section of the bulk material flow from the wide discharge end to the smaller inlet opening of the arrangement, to which the bulk material is supplied. The feeder is often provided as a conveyor belt, so that in the particular case of high throughput quantities a large rectangular cross-section is to be reduced to a small more quadratic or round cross-section. When working with bulk material tending to cake, the danger exists that the bulk material falling down close to the wall, collects against the wall of the chute and thereby progressively decreases the free cross-section. This danger is increased with an increase of the throughput quantities. Admittedly, caking can be avoided by vibrators which act on the wall of the chute. However, such vibrators lead in many cases to excessive oscillation loads of the chute walls in cases of tough caking.

Accordingly, the present invention has the object to change the aforementioned arrangement in such a manner, that blockages of the chute by caking of the bulk material is avoided.

SUMMARY OF THE INVENTION

This object is achieved in accordance with the present invention by providing a trough with a central discharge opening located below the discharge. In this trough one or more transverse conveyors are located conveying towards the central discharge opening. The chute is formed as a vertical gravity tube with essentially uniform cross-section and is connected to the discharge opening. The gravity tube is surrounded by an annular channel guiding a gaseous medium. A gaseous screen is formed against an inner wall of the gravity tube.

The bulk material flow in the transverse conveyor located in the trough in the arrangement in accordance with the present invention is concentrated such that the bulk material comes as little as possible into contact with the wall. The gaseous screen represents a separation layer between the bulk material flow and the wall, which is counteracted by the additional formation of inserts.

The novel features which are considered as characteristic for the invention are set forth in particular in the appended claims. The invention itself, however, both as to its construction and its method of operation, together with additional objects and advantages thereof will be best understood from the following description of specific embodiments when read in connection with the accompanying drawings.

DESCRIPTION OF THE PREFERRED EMBODIMENTS

Figure 1:
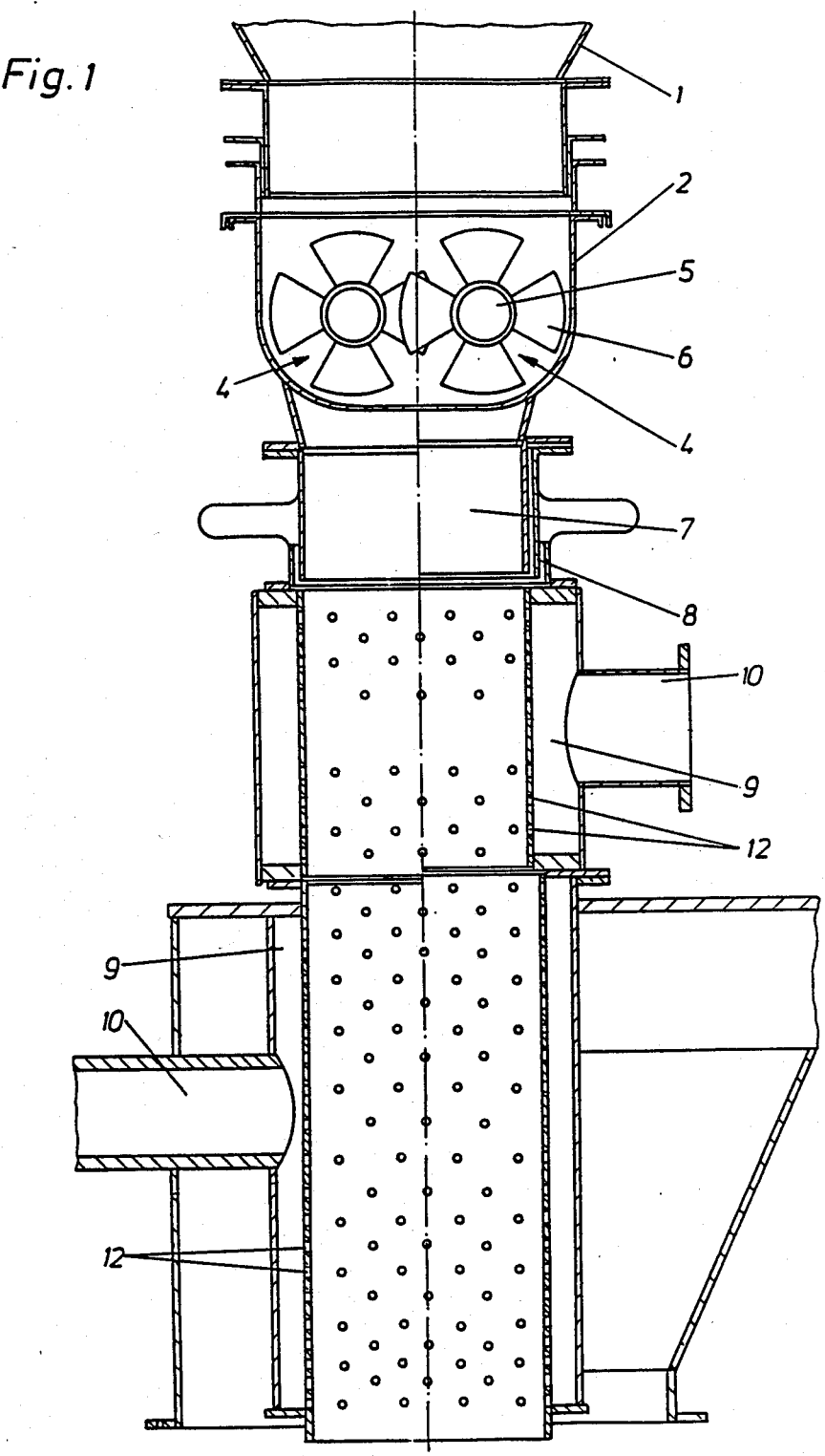
FIG. 1 is a front elevation of an arrangement, in accordance with the present invention.

Only the discharge 1 of a feeder, which for example may be formed as a trough chain conveyor, is illustrated. A trough 2 with a central discharge opening 3 is located below the discharge 1 of the feeder. The width of the trough 2 is larger than that of the discharge 1. In the outer ends of the trough 2, one or more transverse conveyors are provided. The conveying direction thereof is directed towards the central discharge opening 3. Although any type of transverse conveyor can be used, a paddle conveyor 4 has been found to be advantageous.

The paddle conveyor 4 consists of a continuous conveyor shaft 5, on which individual paddles 6 are attached as conveyor elements. The paddles 6 are arranged on the conveyor shaft 5 on both sides of the central discharge opening 3, in such a manner, that their conveyor directions are in opposite directions, and are directed towards the discharge opening 3. The paddle conveyors have the characteristic that they can transport bulk material supplied to them without compaction.

According to FIG. 1, two paddle conveyors 4 are combined into a double paddle conveyor. The paddles 6 of the one conveyor of the double paddle conveyors engage thereby into the spaces between the paddle 6 of the other conveyor.

A vertical gravity tube 7 is arranged below the discharge opening 3 of the trough 2. The gravity tube 7 has a round and essentially uniform cross-section over its full height. The cross-section can increase in stages slightly from its upper end to below. The lower end of the gravity tube 7 is in communication with the inlet opening of an arrangement which is not illustrated. To this arrangement the bulk material discharged by the feeder is supplied. The gravity tube 7 is connected to the housing of the trough 2 via a compensating arrangement 8.

Figure 2:
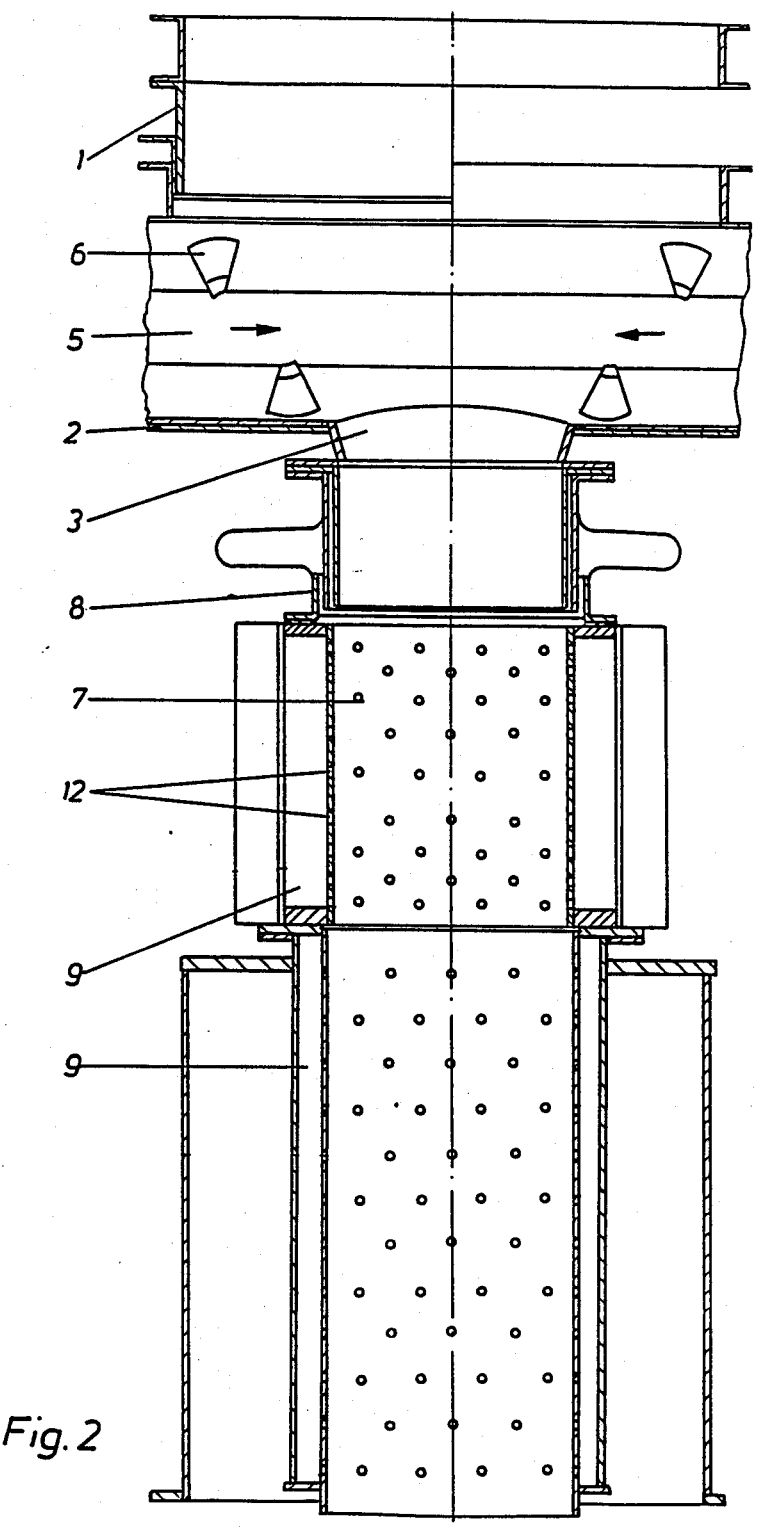
FIG. 2 is an associated side elevation view.

The gravity tube 7 is surrounded by two annular channels 9 according to FIGS. 1 and 2. The annular channels 9 are provided with a connection 10 for a gaseous medium. Advantageously, air is used as the gaseous medium. The annular channels 9 are separated from the inside of the gravity tube 7 by the wall of the gravity tube. Also a single annular channel 9, or more than two annular channels 9, can be arranged relatively to each other in place of the illustrated two annular channels 9. The annular channel or channels 9 can cover the full height of the gravity pipe 7 or can be limited to a part thereof. In an arrangement with several annular channels 9, each annular channel 9 is provided with a separate connection 10, whereby the gas quantity supplied to the annular channels 9 can be controlled separately of each other.

According to FIGS. 1 and 2, the gravity tubes are provided with discharge openings 12. These are distributed over the height and the circumference of the gravity tube. The gaseous medium enters into the inside of the gravity tube 7, through these discharge openings 12, and forms a screen between the inner wall of the gravity tube 7, and the bulk material flow falling down in the gravity tube 7. This gaseous screen prevents contact between the bulk material flow and the gravity tube 7.

Figure 3:
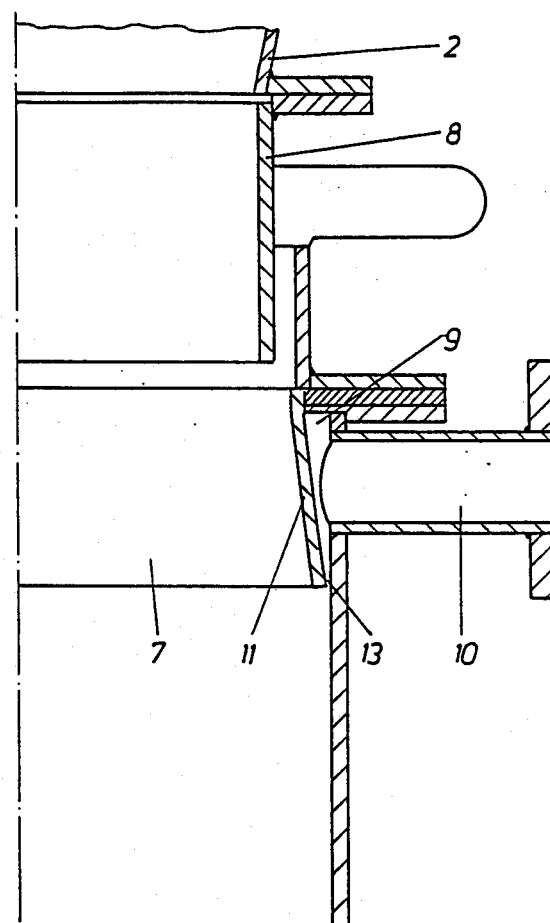
FIG. 3 is a front elevation of another embodiment.
Figure 3:
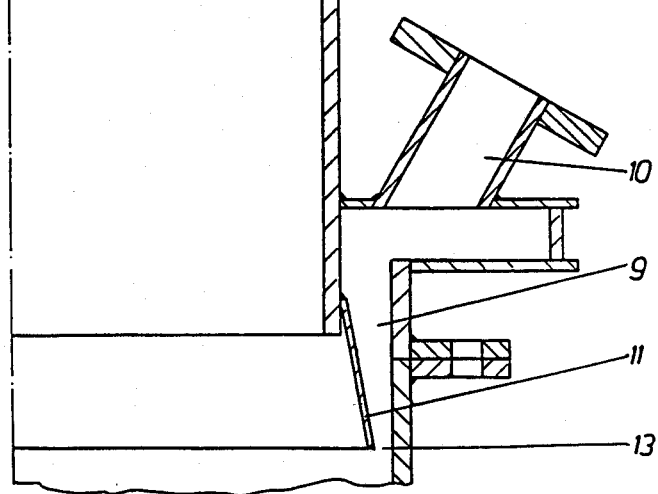

In the embodiment illustrated in FIG. 3, an insert pipe 11 is inclined downwardly. It is free of outlet openings. Between the lower edge of the insert pipe 11 and the gravity tube 7, an annular discharge cross-section 13 is formed. The gaseous medium supplied to the annular channel 9 via the connection pipe 10 emerges through this discharge cross-section 13 into the gravity tube 7 and places itself as gaseous screen between the bulk material flow and the gravity tube 7.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. Arrangement for feeding bulk material tending to cake from a single feeder directly into an inlet opening having a cross-section which is less than that of the discharge of the feeder, comprising: a trough located below the discharge for receiving bulk material directly from said single feeder and having a central discharge opening; transverse conveyors located in said trough for conveying the material only in a transverse directions towards the central discharge opening; a vertical gravity tube of substantially uniform cross-section and connected to said central discharge opening; said gravity tube having discharge openings distributed over the height and circumference of said gravity tube; a source for supplying a gaseous medium, an annular channel surrounding said gravity tube for guiding the gaseous medium, said gaseous medium flowing from said annular channel through said discharge openings and into the interior of said gravity tube to form a gaseous curtain on the inner wall of said gravity tube; said transverse conveyors throwing said bulk material into substantially the center of said gravity tube, said transverse conveyors conveying said material in substantially horizontal direction for concentrating the material flow toward the center of said gravity tube away from walls of the gravity tube, said gaseous curtain directing further said material toward the center of said gravity tube and away from the walls thereof to prevent said material from caking on the walls, said material flow being concentrated within a cross-sectional area that is substantially smaller than the cross-sectional area of said gravity tube, said material being conveyed downward by gravity; said transverse conveyors being positioned directly below said single feeder with discharge of relatively large opening so that said transverse conveyors can concentrate a relatively wide material flow stream from said discharge of relatively large opening into a relatively narrow flow stream of relatively small cross-section.

2. Arrangement for feeding bulk material tending to cake from a single feeder directly into an inlet opening having a cross-section which is less than that of the discharge of the feeder, comprising: a trough located below the discharge for receiving bulk material directly from said single feeder and having a central discharge opening; transverse conveyors located in said trough for conveying the material only in a transverse direction towards the central discharge opening; a vertical gravity tube of substantially uniform cross-section and connected to said central discharge opening; a source for supplying a gaseous medium, an annular channel surrounding said gravity tube and communicating with said source for guiding the gaseous medium; means for permitting said gaseous medium to pass froms said annular channel into said gravity tube to form a gaseous curtain on the inner wall of said gravity tube; said transverse conveyors throwing said bulk material into substantially the center of said gravity tube, said transverse conveyors conveying said material in substantially horizontal direction for concentrating the material flow toward the center of said gravity tube away from walls of the gravity tube, said gaseous curtain directing further said material toward the center of said gravity tube and away from the walls thereof to prevent said material from caking on the walls, said material flow being concentrated within a cross-sectional area that is substantially smaller than the cross-sectional area of said gravity tube, said material being conveyed downward by gravity; said gravity tube being surrounded by a plurality of annular channels arranged end-to-end along said gravity tube, each annular channel having a separate connection to said source for supplying a gaseous medium and being each separately controllable; said transverse conveyors being formed by double paddle conveyors with a continuous conveyor shaft, paddles with different conveyor direction being arranged in said trough on said conveyor shaft on opposite sides of the central discharge opening; said double paddle conveyors operating in opposite directions and being positioned directly below said single feeder with discharge of relatively large opening so that said paddle conveyors can concentrate a relatively wide material flow stream from said discharge of relatively large opening into a relatively narrow flow stream of relatively small cross-section.

* * * * *